United States Patent
Lu

(10) Patent No.: US 10,680,972 B2
(45) Date of Patent: Jun. 9, 2020

(54) STATE REPORT CONTROL METHOD AND APPARATUS

(71) Applicant: ZTE CORPORATION, Shenzhen, Guangdong (CN)

(72) Inventor: Gang Lu, Guangdong (CN)

(73) Assignee: ZTE Corporation, Shenzhen, Guangdong (CN)

( * ) Notice: Subject to any disclaimer, the term of this patent is extended or adjusted under 35 U.S.C. 154(b) by 224 days.

(21) Appl. No.: 15/565,508

(22) PCT Filed: Apr. 1, 2016

(86) PCT No.: PCT/CN2016/078331
§ 371 (c)(1),
(2) Date: Oct. 10, 2017

(87) PCT Pub. No.: WO2016/161918
PCT Pub. Date: Oct. 13, 2016

(65) Prior Publication Data
US 2018/0167335 A1    Jun. 14, 2018

(30) Foreign Application Priority Data

Apr. 10, 2015  (CN) .......................... 2015 1 0169411

(51) Int. Cl.
*H04L 12/00*    (2006.01)
*H04L 12/911*   (2013.01)
(Continued)

(52) U.S. Cl.
CPC ............ *H04L 47/783* (2013.01); *H04L 45/44* (2013.01); *H04L 47/125* (2013.01); *H04L 47/22* (2013.01);
(Continued)

(58) Field of Classification Search
CPC .  H04L 47/783; H04L 47/125; H04L 41/0816; H04L 47/22; H04L 47/825; H04L 45/44; H04L 45/00; H04L 41/0654
(Continued)

(56) References Cited

U.S. PATENT DOCUMENTS 8,885,463 B1 * 11/2014 Medved ................. H04L 45/50
370/228
9,280,447 B2 *  3/2016 Farrell ................ G06F 11/3636
(Continued)

FOREIGN PATENT DOCUMENTS

| CN | 1592252 A   | 3/2005 |
| CN | 101986622 A | 3/2011 |
| CN | 103516602 A | 1/2014 |

OTHER PUBLICATIONS

International Search Report dated Apr. 1, 2016 for International Application No. PCT/CN2016/078331, in 2 pages.
(Continued)

*Primary Examiner* — Frantz Coby
(74) *Attorney, Agent, or Firm* — Knobbe, Martens, Olson and Bear, LLP

(57) ABSTRACT

Disclosed is a state reporting control method, which is applied to a stateful path computation element and includes: setting and notifying an initial subscription state of an LSP state report of a PCC node in a process of session initialization with the PCC node; and sending a subscription update request to the PCC node to subscribe or unsubscribe the LSP state report of the PCC node.

14 Claims, 5 Drawing Sheets

(51) Int. Cl.
*H04L 12/803* (2013.01)
*H04L 12/815* (2013.01)
*H04L 12/721* (2013.01)
*H04L 12/24* (2006.01)

(52) U.S. Cl.
CPC ........ *H04L 47/825* (2013.01); *H04L 41/0816* (2013.01)

(58) Field of Classification Search
USPC ........ 709/226, 224, 223, 225; 370/218, 228, 370/230
See application file for complete search history.

(56) References Cited

U.S. PATENT DOCUMENTS

| | | | | |
|---|---|---|---|---|
| 9,438,508 | B1* | 9/2016 | Medved | H04L 41/12 |
| 9,667,525 | B2* | 5/2017 | Jocha | H04L 45/00 |
| 9,813,333 | B2* | 11/2017 | Zhao | H04L 45/42 |
| 2003/0112756 | A1* | 6/2003 | Le Gouriellec | H04L 45/50 |
| | | | | 370/230 |
| 2007/0149128 | A1* | 6/2007 | Das | H04W 72/0413 |
| | | | | 455/67.11 |
| 2013/0007266 | A1* | 1/2013 | Jocha | H04L 45/00 |
| | | | | 709/224 |
| 2013/0336107 | A1* | 12/2013 | Vasseur | H04L 41/0654 |
| | | | | 370/218 |
| 2013/0336159 | A1 | 12/2013 | Previdi et al. | |
| 2014/0003232 | A1* | 1/2014 | Guichard | H04L 67/16 |
| | | | | 370/230 |
| 2015/0124598 | A1* | 5/2015 | Jang | H04L 5/0053 |
| | | | | 370/230 |

OTHER PUBLICATIONS

Crabbe, et al., "PCEP Extensions for PCE-Initiated LSP Setup in a Stateful PCE Model", draft-ietf-pce-pce-initiated-lsp-02, Oct. 25, 2014 in 16 pages.

Crabbe et al., "PCEP Extensions for Stateful PCE draft-ieff-pce-stataeful-pce-06"—54 pages (Aug. 2013).

Extended European Search Report of corresponding Patent Application No. 16776093.3—8 pages (dated Oct. 12, 2018).

* cited by examiner

Set and notify an initial subscription state of an LSP state report of a PCC node in a process of session initialization with the PCC node — S10

Send a subscription update request to the PCC node to subscribe or unsubscribe the LSP state report of the PCC node — S20

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|        Type           |           Length=4        |            |
+-+-+-+-+-+-+-+-+-+-+-+-+-+-+-+-+-+-+-+-+-+-+-+-+-+-+-+-+-+-+-+-+
|                        Flags                              |S|U|
+-+-+-+-+-+-+-+-+-+-+-+-+-+-+-+-+-+-+-+-+-+-+-+-+-+-+-+-+-+-+-+-+
```

FIG. 9

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                        Flags                              |S|
+-+-+-+-+-+-+-+-+-+-+-+-+-+-+-+-+-+-+-+-+-+-+-+-+-+-+-+-+-+-+-+-+
|                      SRP-ID- Number                            |
+-+-+-+-+-+-+-+-+-+-+-+-+-+-+-+-+-+-+-+-+-+-+-+-+-+-+-+-+-+-+-+-+
|                                                                |
//                      TLVs (Optional)                         //
|                                                                |
+-+-+-+-+-+-+-+-+-+-+-+-+-+-+-+-+-+-+-+-+-+-+-+-+-+-+-+-+-+-+-+-+
```

FIG. 10

STATE REPORT CONTROL METHOD AND APPARATUS

CROSS REFERENCE TO RELATED APPLICATIONS

This application is the U.S. National Phase Application under 35 U.S.C. § 371 of International Application No. PCT/CN2016/078331, filed Apr. 1, 2016, designating the U.S. and published as WO 2016/161918 A1 on Oct. 13, 2016, which claims the benefit of Chinese Patent Application No. 201510169411.8, filed Apr. 10, 2015, both of which are hereby incorporated by reference in their entirety.

TECHNICAL FIELD

The present disclosure relates to, but not limited to the technical field of routing, and relates to a state reporting control method and apparatus.

BACKGROUND

In a transmission network, to realize traffic engineering, constrained path computation is often carried out in accordance with a bandwidth, a price, a label resource and the like. To realize such path computation, the Internet Engineering Task Force (IETF) proposes a path computation element (PCE) for processing all path computation requests in one routing domain or coordinating the PCE in a plurality of domains to process the path computation requests across the plurality of routing domains. The PCE is generally called as a path computation server, and relatively, a requester of the path computation is called as a path computation client (PCC), and the PCE is interacted with the PCC by adopting a path computation element protocol (PCEP). The PCC sends a path computation request (PCReq) to the PCE, and the PCE carries out the constrained path computation according to an own traffic engineering database (TED), and then returns a path result to the PCC through a path computation response (PCRep), thereby completing a path computation.

According to description of RFC4655, the PCE can be classified into a stateless mode and a stateful mode. The stateless PCE can be only synchronized with the TED in topology, and does not understand a state of an existing traffic engineering (TE) label switched path (LSP) in a network. However, the stateful PCE can also be synchronized with LSP DB, in addition to be synchronized with the TED, thereby grasping the state of the existing TE LSP. In this way, for the stateful PCE, information on a full life circle of the LSP is obtained, and the stateful PCE also has an LSP management capability which is an LSP management capability based on a global view, like control plane nodes. The capability can provide more flexible and effective help for the path computation and management of the PCE. The stateful PCE is also one of important characteristics of evolving to a software defined network (SDN).

An implementation framework of the stateful PCE is described in a standard draft draft-ietf-pce-stateful-pce of the IETF. A capability supported by the stateful PCE is negotiated through an Open message when a PCC end and a PCE end initialize a PCEP session. If the negotiation is succeeded, the PCC end starts to report an LSP state to the PCE when the LSP state is changed. As shown in FIG. 1, when the LSP state at a PCC side is changed, a change situation of the LSP state is continuously reported to the stateful PCE through PCRpt message. This is a general process of reporting the LSP state report.

Application scenarios of the stateful PCE are described in the draft draft-ietf-pce-stateful-pce-app-01 of the IETF. After the stateful PCE is restarted in survivability of the PCE in section 4.3, a session is established by the started PCE and each PCC in an existing mode, and once the session is successfully established, the PCC reports the LSP state report to the PCE immediately, and carries out synchronization of the LSP state.

However, the transient LSP state report may cause that the PCE is overloaded or is not processed in time. Some other methods are also proposed in the draft, for example, solution 1: with a locally stored backup, the stateful PCE can firstly recover from the backup after being started, or solution 2: synchronization is carried out from another stateful PCE on a premise of realizing host and backup of the stateful PCE. But for solution 1, a new state report and a backup need to be contrasted one by one to keep consistent subsequently in this mode, and the amount of computation is not small; and due to a real-time change of the state report, the backup also needs to be backed up in real time, thereby aggravating an I/O burden of the stateful PCE; and for solution 2, the premise is that the host and backup of the stateful PCE are realized, causing high deployment cost.

In addition, if the stateful PCE needs to be switched to the stateless PCE currently, the PCEP session of the PCE and all PCC nodes must be disconnected; and session establishment is reissued, which indicates no capability of the stateful PCE. This mode has a large influence in a current network, but cannot forbid the PCC to report the LSP state report if the session is not disconnected.

SUMMARY

A subject described in detail in the present disclosure will be summarized below. The summary is not intended to limit a protection range of claims.

Embodiments of the present disclosure provide a state reporting control method and apparatus, so that a stateful path computation element can flexibly control a flow of reporting a label switched path state report by a path computation client node.

Embodiments of the present disclosure provide a state reporting control method, applied to a stateful path computation element, including:

setting and notifying an initial subscription state of a label switched path (LSP) state report of a path computation client (PCC) node in a process of session initialization with the PCC node; and sending a subscription update request to the PCC node to subscribe or unsubscribe the LSP state report of the PCC node.

Optionally, the setting and notifying an initial subscription state of an LSP state report of a PCC node in a process of session initialization with the PCC node includes:

carrying an indication information for setting an initial subscription state of the LSP state report of the PCC node as a subscription state in a message of session initialization with each PCC node after restarting and when it is in a stateful operation mode.

Optionally, the sending a subscription update request to the PCC node to subscribe or unsubscribe the LSP state report of the PCC node includes:

sending, after restarting, subscription update requests successively to nodes in a PCC node list to subscribe the LSP state report of the PCC node, or sending, after switching from a stateless operation mode to a stateful operation mode, subscription update requests to nodes in the PCC node list to subscribe the LSP state report of the PCC node; and simultaneously or successively sending, after switching from a stateful operation mode to a stateless operation mode, subscription update requests to the nodes in the PCC node list to unsubscribe the LSP state report of the PCC node.

Optionally, the setting and notifying an initial subscription state of an LSP state report of a PCC node in a process of session initialization with the PCC node includes:

sending an Open message in a process of session initialization with the PCC node, and carrying a flag bit, for indicating to set an initial subscription state of the LSP state report of all LSPs on the PCC node, in a stateful PCE capability TLV of the Open message.

Optionally, the sending a subscription update request to the PCC node to subscribe or unsubscribe the LSP state report of the PCC node includes:

sending a PCUpt message to the PCC node, and carrying a flag bit, for indicating to subscribe or unsubscribe the LSP state report of any LSP on the PCC node, in a stateful PCE request parameters (SRP) object of the PCUpt message.

Optionally, the initial subscription state of the LSP state report of the PCC node includes: a subscription state or an unsubscription state.

Embodiments of the present disclosure provide a state reporting control method, applied to a PCC node, including:

determining an initial subscription state of a LSP state report of a PCC node in a process of session initialization with a stateful PCE according to an indication of the stateful PCE;

receiving a subscription update request sent by the stateful PCE, where the subscription update request carries a subscription indication for subscribing or unsubscribing the LSP state report; and reporting or un-reporting the LSP state report of the PCC node according to the subscription indication of the stateful PCE.

Optionally, the initial subscription state of the LSP state report includes: a subscription state or an unsubscription state.

Optionally, the reporting or un-reporting the LSP state report of the PCC node according to the subscription indication of the stateful PCE includes:

reporting the LSP state report of the LSP to the stateful PCE in a notification mode if the state of the LSP is detected to be changed when the subscription indication of the stateful PCE is to subscribe the LSP state report of any LSP on the node; and inhibiting the reporting of the LSP state report of the LSP when the subscription indication of the PCE is to unsubscribe the LSP state report of any LSP on the node.

Embodiments of the present disclosure provide a state reporting control apparatus, applied to a stateful PCE, including:

a subscription initialization module configured to: set and notify an initial subscription state of an LSP state report of a PCC node in a process of session initialization with the PCC node; and a subscription update module configured to: send a subscription update request to the PCC node to subscribe or unsubscribe the LSP state report of the PCC node.

Optionally, the subscription initialization module is configured to: carry an indication information for setting an initial subscription state of the LSP state report of the PCC node as a subscription state in a message of session initialization with each PCC node after restarting and when it is in a stateful operation mode.

Optionally, the subscription update module is configured to:

successively send, after restarting, subscription update requests to nodes in a PCC node list to subscribe the LSP state report of the PCC node, or send, after switching from a stateless operation mode to a stateful operation mode, subscription update requests to nodes in the PCC node list to subscribe the LSP state report of the PCC node; and simultaneously or successively send, after switching from a stateful operation mode to a stateless operation mode, subscription update requests to the nodes in the PCC node list to unsubscribe the LSP state report of the PCC node.

Optionally, the subscription initialization module is configured to: send an Open message in a process of session initialization with the PCC node, and carry a flag bit, for indicating to set an initial subscription state of the LSP state report of all LSPs on the PCC node, in a stateful PCE capability TLV of the Open message.

Optionally, the subscription update module is configured to:

send a PCUpt message to the PCC node, and carry a flag bit, for indicating to subscribe or unsubscribe the LSP state report of any LSP on the PCC node, in a stateful PCE request parameters (SRP) object of the PCUpt message.

Optionally, the initial subscription state of the LSP state report of the PCC node includes: a subscription state or an unsubscription state.

Embodiments of the present disclosure provide a state reporting control apparatus, applied to a PCC node, including:

a subscription initialization module, configured to determine an initial subscription state of a LSP state report of a node in a process of session initialization with a stateful PCE according to an indication of the stateful PCE;

a subscription update module, configured to receive a subscription update request sent by the stateful PCE, wherein the subscription update request carries a subscription indication for subscribing or unsubscribing the LSP state report; and a reporting processing module, configured to report or un-report the LSP state report of the node according to the subscription indication of the stateful PCE.

Optionally, the initial subscription state of the LSP state report includes: a subscription state or an unsubscription state.

Optionally, the reporting processing module is configured to:

report the LSP state report of the LSP to the stateful PCE in a notification mode if the state of the LSP is detected to be changed when the subscription indication of the stateful PCE is to subscribe the LSP state report of any LSP on the node; and inhibit the reporting of the LSP state report of the LSP when the subscription indication of the PCE is to unsubscribe the LSP state report of any LSP on the node.

Embodiments of the present application provide a computer readable storage medium, storing computer executable instructions which are executed to realize the state reporting control method applied to the stateful PCE.

Embodiments of the present application provide a computer readable storage medium, storing computer executable instructions which are executed to realize the state reporting control method applied to the PCC node.

The state reporting control method and apparatus provided in embodiments of the present disclosure can enable the stateful path computation element to flexibly control the flow of reporting the LSP state report by the PCC node, can start or stop the reporting of the LSP state of the PCC node at any time according to a need of the stateful PCE, can synchronize LSP DB data in a point-by-point subscription mode, and can also unsubscribe the state in a point-by-point mode, thereby limiting generation and formation of a large amount of traffic data by the synchronized data within short time. Moreover, when the stateful PCE is changed from the stateful operation mode to the stateless operation mode, reporting can be cancelled by unsubscribing only; and when the stateful PCE is changed from the stateless operation mode to the stateful operation mode, a report message can be reacquired by subscribing only. A session does not need to be reestablished when the stateful PCE switches the operation mode.

Other aspects can be understood after drawings and detailed description are read and comprehended.

BRIEF DESCRIPTION OF DRAWINGS

FIG. 9 depicts one example of an extension of the Stateful PCE Capability TLV; and FIG. 10 depicts on example of an extended SRP object carried in the PCUpt message.

DETAILED DESCRIPTION

Embodiments of the present disclosure will be described below in detail in combination with drawings. It should be noted that embodiments in the present application and features in embodiments can be combined mutually without conflict.

In embodiments of the present disclosure, an LSP state reporting process between stateful PCE and PCC is designed into a subscription mode and a notification mode. The stateful PCE can subscribe or unsubscribe an LSP state report for the PCC according to needs; if subscribing, PCC sends the LSP state report as a notification to the stateful PCE; otherwise, PCC does not send the LSP state report to the PCE.

Figures 1, 2:
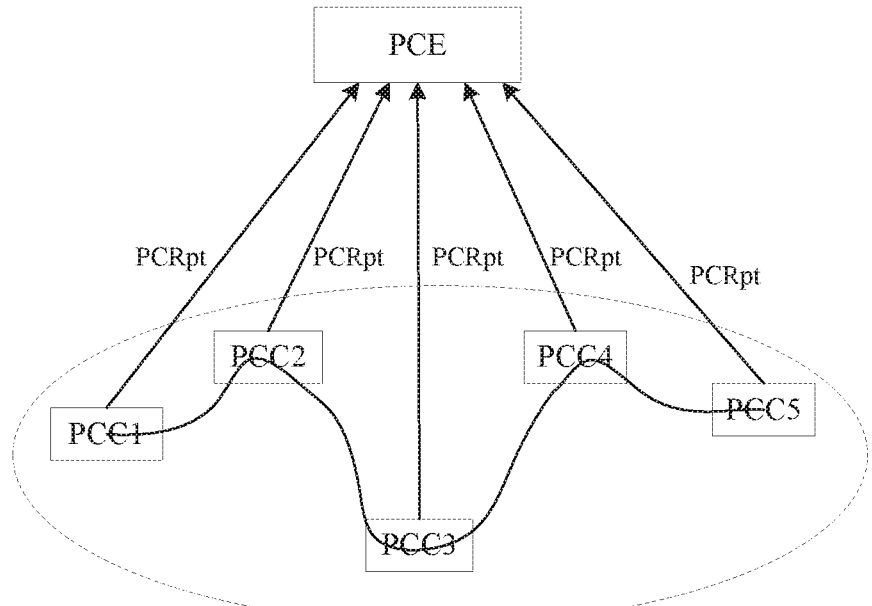
FIG. 1 is a schematic diagram illustrating an LSP state report in a relevant technology.
FIG. 2 is a flow chart illustrating a state reporting control method (PCE side) in embodiments of the present disclosure.

As shown in FIG. 2, embodiments of the present disclosure provide a state reporting control method applied to a stateful path computation element and including:

step S10, an initial subscription state of an LSP state report of a PCC node is set and notified in a process of session initialization with the PCC node; and step S20, a subscription update request is sent to the PCC node to subscribe or unsubscribe the LSP state report of the PCC node.

Optionally, the initial subscription state of the LSP state report of the PCC node includes: a subscription state or an unsubscription state.

Optionally, the PCC node does not report the LSP state report of any LSP to the stateful PCE after the initial subscription state of the LSP state report of the PCC node is set as an unsubscription state; and the LSP state report of the LSP is reported to the stateful PCE after the PCC node detects that the state of any LSP is changed when the initial subscription state of the LSP state report of the PCC node is set as a subscription state.

Optionally, a step of setting and notifying an initial subscription state of an LSP state report of a PCC node in a process of session initialization with the PCC node includes:

information for indicating the stateful PCE node to set the initial subscription state of the LSP state report of the PCC node is carried in a message of session initialization with the PCC node.

For example, an Open message is sent in the process of session initialization with the PCC node, and a flag bit, for indicating to set the initial subscription state of the LSP state report of all LSPs on the PCC node, is carried in a stateful PCE capability type length value (TLV) of the Open message.

For example, information for indicating the PCE node to set the initial subscription state of the LSP state report of the PCC node is carried through other TLVs or objects in the Open message.

Optionally, a step of sending a subscription update request to the PCC node to subscribe or unsubscribe the LSP state report of the PCC node includes:

a PCUpt message is sent to the PCC node, and a flag bit, for indicating to subscribe or unsubscribe the LSP state report of any LSP on the PCC node, is carried in a stateful PCE request parameters (SRP) object of the PCUpt message.

For example, a new message can also be defined especially as a message for subscribing or unsubscribing the LSP state report.

Optionally, a step of setting and notifying an initial subscription state of an LSP state report of a PCC node in a process of session initialization with the PCC node includes:

an indication information for setting an initial subscription state of the LSP state report of the PCC node as a subscription state is carried in a message of session initialization with each PCC node after restarting and when it is in a stateful operation mode.

Optionally, a step of sending a subscription update request to the PCC node to subscribe or unsubscribe the LSP state report of the PCC node includes:

subscription update requests are successively sent to nodes in a PCC node list after restarting to subscribe the LSP state report of the PCC node, or subscription update requests are sent to nodes in the PCC node list after switching from a stateless operation mode to a stateful operation mode to subscribe the LSP state report of the PCC node, or subscription update requests are sent to the nodes in the PCC node list after switching from a stateful operation mode to a stateless operation mode to unsubscribe the LSP state report of the PCC node.

Namely, the stateful PCE can specify whether to subscribe the LSP state report on the PCC node according to a need scenario, such as a role change and the like when the stateful PCE is switched from a stateful operation mode to a stateless operation mode or switched from a stateless operation mode to a stateful operation mode in restarting and initialization after recovery. Relevant settings are made on the stateful PCE.

Figure 3:
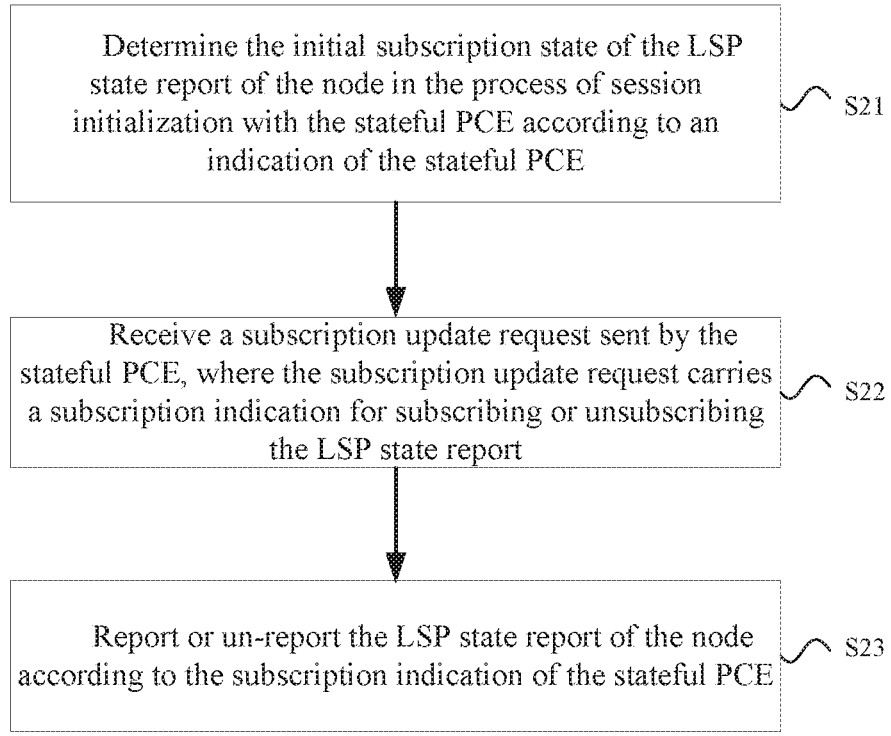
FIG. 3 is a flow chart illustrating a state reporting control method (PCC side) in embodiments of the present disclosure.

In the present embodiment, subscription update requests can be simultaneously or successively sent to nodes in the PCC node list after switching from a stateless operation mode to a stateful operation mode to subscribe the LSP state report of the PCC node; and subscription update requests can be simultaneously or successively sent to the nodes in the PCC node list after switching from a stateful operation mode to a stateless operation mode to unsubscribe the LSP state report of the PCC node. As shown in FIG. 3, embodiments of the present disclosure provide a state reporting control method applied to a PCC node and including:

step S21, the initial subscription state of the LSP state report of the node is determined in the process of session initialization with the stateful PCE according to the indication of the PCE;

step S22, a subscription update request sent by the PCE is received, and a subscription indication for subscribing or unsubscribing the LSP state report is carried in the subscription update request; and step S23, the LSP state report of the node is reported or un-reported according to the subscription indication of the PCE.

Optionally, the initial subscription state of the LSP state report includes: a subscription state or an unsubscription state.

Optionally, a step of reporting or un-reporting the LSP state report of the PCC node according to the subscription indication of the stateful PCE includes:

the LSP state report of the LSP is reported to the stateful PCE in a notification mode if the state of the LSP is detected to be changed when the subscription indication of the stateful PCE is to subscribe the LSP state report of any LSP on the node; and the reporting of the LSP state report of the LSP is inhibited when the subscription indication of the PCE is to unsubscribe the LSP state report of any LSP on the node.

Figure 4:
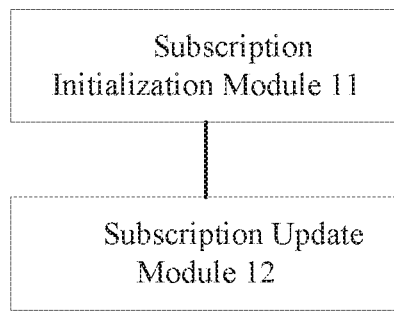
FIG. 4 is a schematic structural diagram illustrating a state reporting control apparatus (PCE) in embodiments of the present disclosure.

As shown in FIG. 4, embodiments of the present disclosure provide a state reporting control apparatus applied to a stateful PCE and including:

a subscription initialization module 11 configured to set and notify an initial subscription state of an LSP state report of a PCC node in a process of session initialization with the PCC node; and a subscription update module 12 configured to send a subscription update request to the PCC node to subscribe or unsubscribe the LSP state report of the PCC node.

Optionally, the subscription initialization module 11 is configured to: carry an indication information for setting an initial subscription state of the LSP state report of the PCC node as a subscription state in a message of session initialization with each PCC node after restarting and when it is in a stateful operation mode.

Optionally, the subscription update module 12 is configured to: successively send subscription update requests to nodes in a PCC node list after restarting to subscribe the LSP state report of the PCC node, or send subscription update requests to nodes in the PCC node list after switching from a stateless operation mode to a stateful operation mode to subscribe the LSP state report of the PCC node, or send subscription update requests to the nodes in the PCC node list after switching from a stateful operation mode to a stateless operation mode to unsubscribe the LSP state report of the PCC node.

Optionally, the subscription initialization module 11 is configured to: send an Open message in the process of session initialization with the PCC node, and carry a flag bit, for indicating to set an initial subscription state of the LSP state report of all LSPs on the PCC node, in a stateful PCE capability TLV of the Open message.

Optionally, the subscription update module 12 is configured to:

send a PCUpt message to the PCC node, and carry a flag bit, for indicating to subscribe or unsubscribe the LSP state report of any LSP on the PCC node, in a stateful PCE request parameters (SRP) object of the PCUpt message.

Optionally, the initial subscription state of the LSP state report of the PCC node includes: a subscription state or an unsubscription state.

Figure 5:
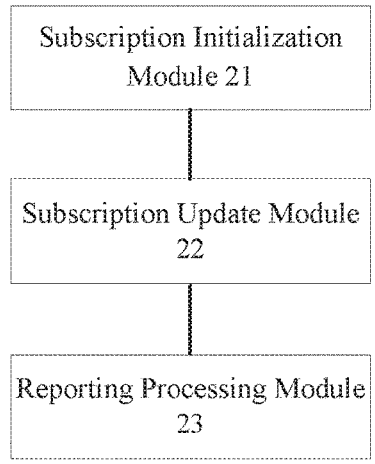
FIG. 5 is a schematic structural diagram illustrating a state reporting control apparatus (PCC) in embodiments of the present disclosure.

As shown in FIG. 5, embodiments of the present disclosure provide a state reporting control apparatus applied to a PCC node and including:

a subscription initialization module 21 configured to determine the initial subscription to state of the LSP state report of the node in the process of session initialization with the stateful PCE according to the indication of the stateful PCE;

a subscription update module 22 configured to receive a subscription update request sent by the stateful PCE, where the subscription update request carries a subscription indication for subscribing or unsubscribing the LSP state report; and a reporting processing module 23 configured to report or un-report the LSP state report of the node according to the subscription indication of the stateful PCE.

Optionally, the initial subscription state of the LSP state report includes: a subscription state or an unsubscription state.

Optionally, the reporting processing module 23 is configured to:

report the LSP state report of the LSP to the stateful PCE in a notification mode if the state of the LSP is detected to be changed when the subscription indication of the stateful PCE is to subscribe the LSP state report of any LSP on the node; and inhibit the reporting of the LSP state report of the LSP when the subscription indication of the PCE is to unsubscribe the LSP state report of any LSP on the node.

Technical solutions of embodiments of the present disclosure are further described below in combination with application examples.

Embodiment 1

In this example, a subscription state setting indicating flag is carried in the Open message.

Figure 6:
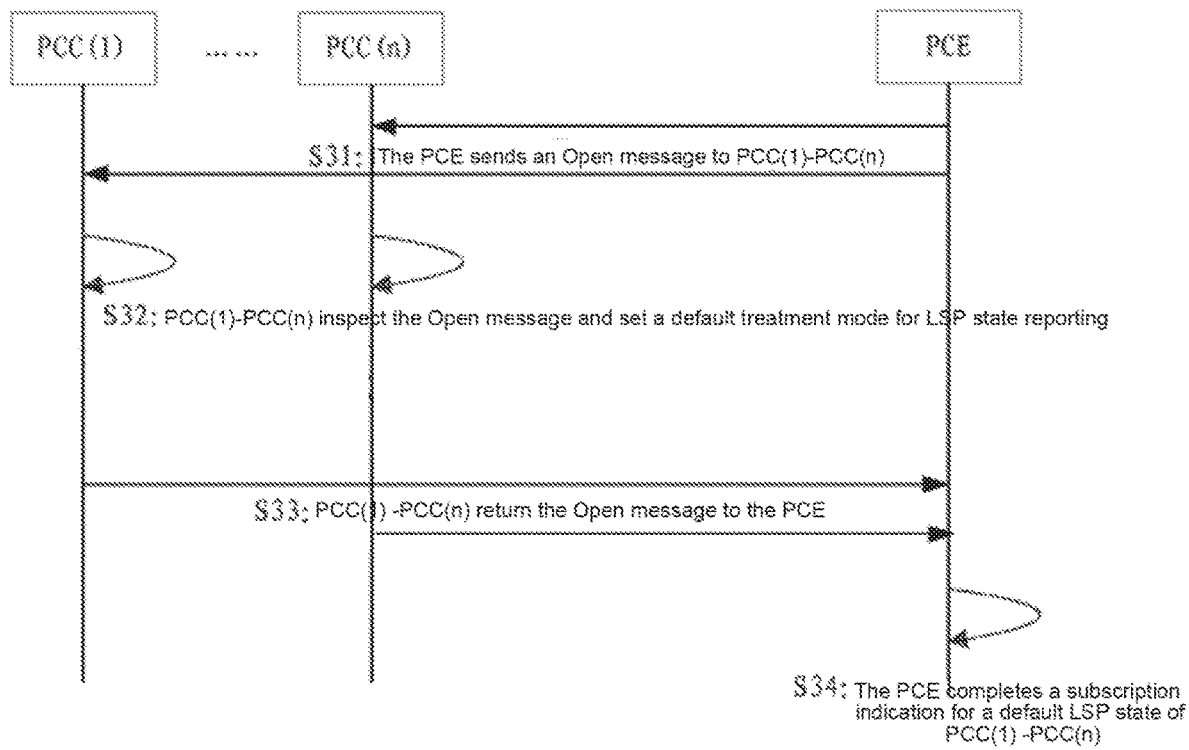
FIG. 6 is an information interaction diagram illustrating an application example 1 of the present disclosure (carrying a subscription state setting indication flag in an Open message)

As shown in FIG. 6, PCC(1)-PCC(n) are n PCC nodes in a network; n is an positive integer greater than or equal to 1; and the PCE is a stateful PCE. Through the adoption of the technical solutions of embodiments of the present disclosure, an indicating flag about whether the LSP state report on each default PCC is reported at an initialization phase. Namely, PCE and PCCs (PCC(1)-PCC(n)) negotiate a stateful capability during session initialization, and the PCE designates an initial subscription state of the LSP state report on the PCCs (PCC(1)-PCC(n)).

In this example, extension is carried out based on Flags in Stateful PCE Capability TLV in the Open message, thereby realizing an indicating flag about whether the LSP state report on the PCCs is reported. The process is as follows:

Step S31: The PCE sends the Open message to the PCC(1)-PCC(n), wherein the Stateful PCE Capability TLV is carried in the Open message, and the extension of the TLV is shown in FIG. 9.

Flags can be used for self extension. Currently, a U bit (a highest bit) is only defined in a standard. An S bit is extended and defined in this example. The S bit (LSP-REPORT-SUBSCRIBE-FLAG) is one bit and is lower than the U bit by one bit. When the S bit is set as 1, it indicates that the PCE subscribes reporting notices of state reports of all LSPs to the PCCs, and indicates that the PCCs open state reporting notices of all LSPs by default; and when the S bit is set as 0, it indicates that the PCE unsubscribes the reporting notices of the state reports of all LSPs to the PCCs, and indicates that the PCCs close the state reporting notices of all LSPs by default.

It should be noted that, a sequence that the PCE sends the Open message to each PCC can be decided according to a sequence of TCP session requests initiated at a PCC end, and the PCE firstly sends the Open message to a PCC which firstly initiates TCP session connection.

Step S32: PCC(1)-PCC(n) inspect that the Stateful PCE Capability TLV is included in the Open message, further confirm whether the S bit is included therein, and set a default treatment mode of the LSP state reporting according to a set value of the S bit.

Step S33: PCC(1)-PCC(n) return the Open message to the PCE, wherein the Stateful PCE Capability TLV is carried in the Open message, without a need for extending the S bit. After the PCE receives the Open message of the PCCs, the stateful capability is negotiated according to a relevant standard, without a need for treating the S bit.

Step S34: The PCE completes subscription indication of the default LSP state of PCC(1)-PCC(n).

Embodiment 2

In this example, the stateful PCE is restarted after recovery and the LSP state updating is carried out.

Figure 7:
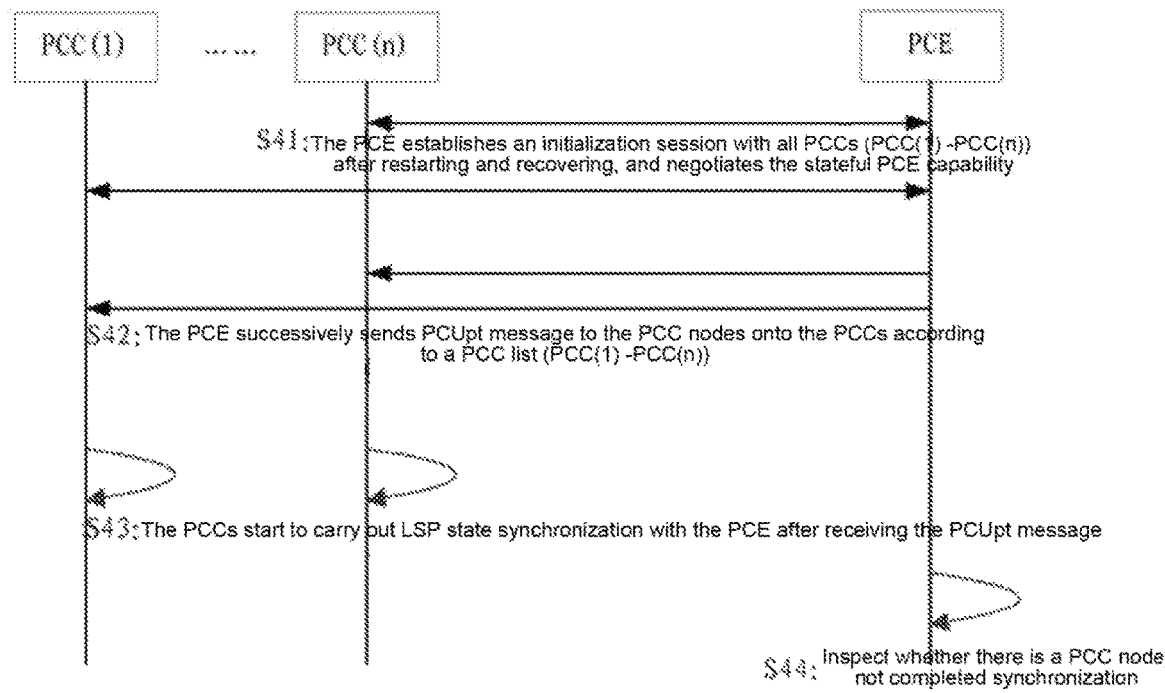
FIG. 7 is an information interaction diagram illustrating an application example 2 of the present disclosure (restarting to perform LSP state update after a stateful PCE is restored)

As shown in FIG. 7, PCC(1)-PCC(n) are n PCC nodes in a network; n is an positive integer greater than or equal to 1; and the PCE is the stateful PCE. When the stateful PCE is recovered from a fault, since stored LSP state data is lost or is inconsistent with the data on the PCCs, the LSP state data is updated after restarting. Through adoption of the method of embodiments of the present disclosure, the stateful PCE can control the LSP state data updating orderly, and the process is as follows:

Step S41: The PCE establishes an initialization session with all PCCs (PCC(1)-PCC(n)) after restarting and recovering, and negotiates the Stateful PCE Capability.

The S bit extended in the TLV is set as 0, i.e., the LSP state report on PCC(1)-PCC(n) is firstly unsubscribed, so that all PCCs do not report the LSP state report data temporarily to the stateful PCE at the same time, and i.e., the PCE and PCCs (PCC(1)-PCC(n)) negotiate the stateful capability during the session initialization, and the PCE designates the initial subscription state of the LSP state report on the PCCs (PCC(1)-PCC(n)) as "unsubscription".

Step S42: The PCE sends PCUpt message to a PCC node onto the PCC according to a PCC list (PCC(1)-PCC(n)).

An SRP object carried in the PCUpt message needs to be extended as follows, as shown in FIG. 10.

Flags are 32-bit, wherein the highest bit is extended to the S bit. When the S bit is set as 1, it indicates that the PCE indicates the PCCs to subscribe state reporting of any LSP; and when the S bit is set as 0, it indicates that the PCE indicates the PCCs to unsubscribe the state reporting of any LSP.

The PCUpt message includes an LSP object and an SRP object, wherein the LSP object can only designate a specific LSP ID, i.e., a certain LSP. Namely, the LSP object carries attribute information (including the LSP ID, and the like) of the LSP, and the SRP object is a request attribute of the stateful PCE, and is mainly used for associating the PCUpt request with the state reporting. Therefore, the LSP object describes which the LSP on the PCCs is updated by the PCE, and the SRP object describes how to update and which operations are provided. The extension of the S bit in the SRP object in embodiments of the present disclosure plays a role of setting the state reporting of the LSP.

The PCE sends PCUpt to the PCCs (PCC(1)-PCC(n)), and indicates to start to subscribe the LSP state report on the PCCs (PCC(1)-PCC(n)); and the S bit is 1.

Step S43: The PCCs start to carry out the LSP state synchronization with the PCE after receiving the PCUpt message sent in step S42 until synchronization is completed.

Namely, the PCE receives the synchronous PCRpt state report data from the PCCs, and synchronizes the data to an LSP database.

Step S44: The PCE inspects whether there is a PCC node not completed synchronization; if so, the PCE starts to find a next PCC node and starts to repeat the above operation from step 2); and if no, a recovery operation of the stateful PCE is ended.

Embodiment 3

In this example, the stateful PCE changes an own state from the stateful mode to a stateless mode.

Figure 8:
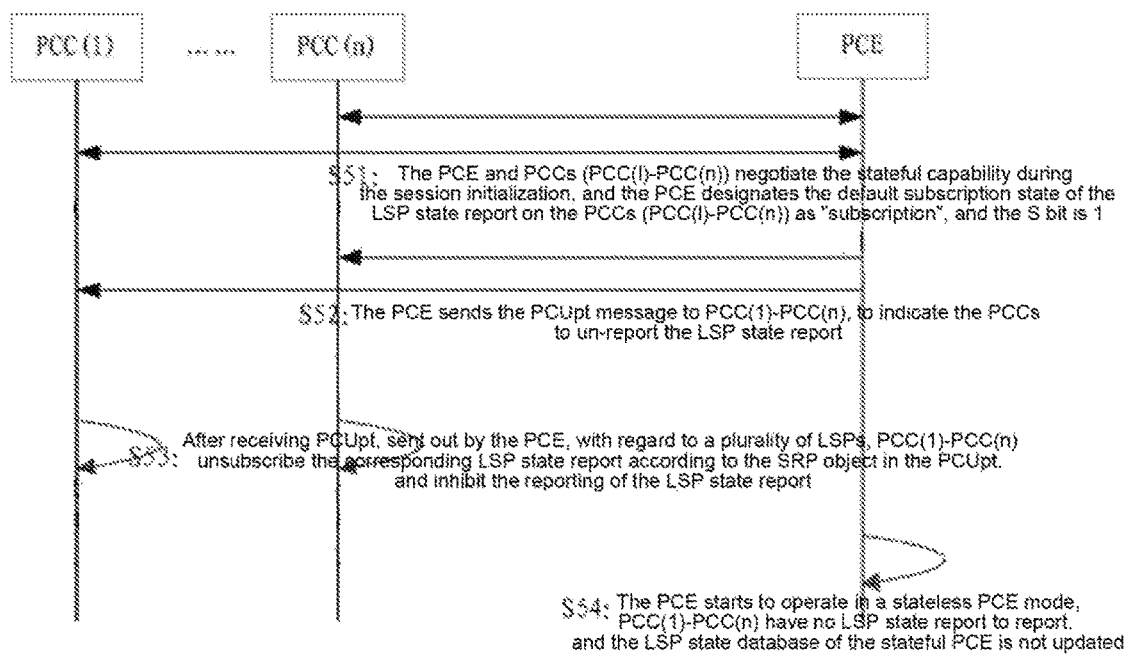
FIG. 8 is an information interaction diagram illustrating an application example 3 of the present disclosure (a stateful PCE changes an own operation mode from a stateful operation mode to a stateless operation mode)

As shown in FIG. 8, PCC(1)-PCC(n) are n PCC nodes in a network; n is an positive integer greater than or equal to 1; and the PCE is the stateful PCE. The stateful PCE may select to change the own state from the stateful PCE into the stateless PCE due to own needs, such as improving performance. A specific process of adopting the method of embodiments of the present disclosure is as follows:

Step S51: The PCE and PCCs (PCC(1)-PCC(n)) negotiate the stateful capability during the session initialization, and the PCE designates the default subscription state of the LSP state report on the PCCs (PCC(1)-PCC(n)) as "subscription", and the S bit is 1;

Step S52: The PCE sends the PCUpt message to PCC(1)-PCC(n), and indicates the PCCs to un-report the LSP state report.

The SRP object carried in the PCUpt message needs to be extended as follows, as show in FIG. 10.

Flags are 32-bit, wherein the highest bit is extended to the S bit. When the S bit is set as 1, it indicates that the PCE indicates the PCCs to subscribe state reporting of any LSP; and when the S bit is set as 0, it indicates that the PCE indicates the PCCs to unsubscribe the state reporting of any LSP.

Step S53: PCC(1)-PCC(n) unsubscribe the corresponding LSP state report according to the SRP object therein after receiving PCUpt sent out by the PCE with regard to a plurality of LSPs, and inhibit the reporting of the LSP state report.

Step S54: The PCE starts to operate in a stateless PCE mode; PCC(1)-PCC(n) have no LSP state reporting; and the LSP state database of the stateful PCE is not updated.

The state reporting control method and apparatus provided by embodiments of the present disclosure can enable the stateful PCE to flexibly control the flow of reporting the LSP state report by the PCC node, can open or stop the LSP state reporting of the PCC node at any time according to the need of the PCE, can synchronize LSP DB data by a point-by-point subscription mode, and can also unsubscribe point by point, thereby limiting generation and formation of a large amount of traffic data by the synchronous data within short time. Moreover, when the stateful PCE is changed from a stateful operation mode into a stateless operation mode, reporting can be canceled by unsubscription only; and when the stateful PCE is changed from the stateless operation mode into the stateful operation mode, a report message can be reacquired only by initiating the subscription. The session is not reestablished for the transformation of the operation mode of the stateful PCE.

Embodiments of the present disclosure provide a computer readable storage medium, storing computer executable instructions which are executed to realize the state reporting control method applied to the stateful PCE.

Embodiments of the present disclosure provide a computer readable storage medium, storing computer executable instructions which are executed to realize the state reporting control method applied to the PCC node.

Those ordinary skilled in the art can understand that all or some steps in the above method can be completed through programs to instruct relevant hardware (such as a processor). The programs can be stored in a computer readable storage medium, such as a read-only memory, a disk or CD and the like. Optionally, all or some steps of above embodiments can be realized using one or more integrated circuits. Accordingly, each module/unit in above embodiments can be realized in a form of hardware, e.g., realizing a corresponding function through the integrated circuits, or can be realized in a form of a software function module, e.g., realizing a corresponding function by the processor to execute programs/instructions stored in a memory. The present application is not limited to any specific form of hardware and software combination.

It should be noted that the present application can also have many other embodiments. Various corresponding changes and variations can be made by those skilled familiar with the art according to the present disclosure without departing from the spirit and essence of the present application, but these corresponding changes and variations should belong to a protection scope of appended claims of the present application.

INDUSTRIAL APPLICABILITY

Above embodiments can enable the stateful path computation element to flexibly control the flow of reporting the LSP state report by the PCC node, thereby limiting generation and formation of a large amount of traffic data by the synchronized data within short time.

What is claimed is:

1. A state reporting control method applied to a stateful path computation element ("PCE"), the method comprising:
   setting and notifying an initial subscription state of a label switched path ("LSP") state report of a path computation client ("PCC") node during session initialization with the PCC node; and
   sending a subscription update request to the PCC node to subscribe or unsubscribe the LSP state report of the PCC node;
   wherein the sending a subscription update request to the PCC node to subscribe or unsubscribe the LSP state report of the PCC node comprises:
      sending, after restarting, subscription update requests successively to nodes in a PCC node list to subscribe the LSP state report of the PCC node, or
      sending, after switching from a stateless operation mode to a stateful operation mode, subscription update request to nodes in the PCC node list to a subscribe the LSP state report of the PCC node; or
      sending, after switching from a stateful operation mode to a stateless operation mode, subscription update requests to the nodes in the PCC node list to unsubscribe the LSP state report of the PCC node.

2. The method according to claim 1, wherein setting and notifying the initial subscription state of the LSP state report of the PCC node during session initialization with the PCC node comprises:
   transmitting an indication information for setting an initial subscription state of the LSP state report of the PCC node as a subscription state in a message of session initialization with each PCC node after restarting and when the stateful PCE is in a stateful operation mode.

3. The method according to claim 1, wherein setting and notifying the initial subscription state of the LSP state report of the FCC node during session initialization with the PCC node comprises:
   sending an Open message during session initialization with the PCC node, and transmitting a flag bit, for indicating to set an initial subscription state of the LSP state report of all LSPs on the PCC node, in a stateful PCE capability type length value, TLV, of the Open message.

4. The method according to claim 1, wherein the initial subscription state of the LSP state report of the PCC node comprises: a subscription state or an unsubscription state.

5. A state reporting control method applied to a path computation client ("PCC") node, the method comprising:
   determining an initial subscription state of a label switched path ("LSP") state report of a PCC node during session initialization with a stateful path computation element ("PCE") according to an indication of the stateful PCE;
   receiving a subscription update request sent by the stateful PCE, wherein the subscription update request includes a subscription indication for subscribing or unsubscribing the LSP state report; and
   reporting or un-reporting the LSP state report of the PCC node according to the subscription indication of the stateful PCE;
   wherein before receeiving a subscription update request sent by the stateful PCE, the stateful PCE sends a subscription update request to the PCC node to subscribe or unsubscribe the LSP state report of the PCC node, which comprises:
the stateful PCE sends, after restarting, subscription update requests successively to nodes in a PCC node lit to subscribe the LSP state report of the PCC node, or
the stateful PCE sends, after switching from a stateless operation mode to a stateful operation mode, subscription update requests to nodes in the PCC node list to subscribe the LSP state report of the PCC node; or
the stateful PCE sends, after switching from a stateful operation mode to a stateless operation mode, subscription update requests to the nodes in the PCC node list to unsubscribe the LSP state report of the PCC node.

6. The method according to claim 5, wherein the initial subscription state of the LSP state report comprises: a subscription state or an unsubscription state.

7. The method according to claim 6, wherein the reporting or un-reporting the LSP state report of the PCC node according to the subscription indication of the stateful PCE comprises:
reporting the LSP state report of the LSP to the stateful PCE in a notification mode if the state of the LSP is detected to be changed when the subscription indication of the stateful PCE is to subscribe the LSP state report of any LSP on the node; and
inhibiting the reporting of the LSP state report of the LSP when the subscription indication of the PCE is to unsubscribe the LSP state report of any LSP on the node.

8. A state reporting control apparatus; applied to a stateful path computation element ("PCE"), the apparatus comprising:
a subscription initializer configured to: set and notify an initial subscription state of an label switched path ("LSP") state report of a path computation client ("PCC") node during session initialization with the PCC node; and
a subscription updater configured to: send a subscription update request to the PCC node to subscribe or unsubscribe the LSP state report of the PCC node;
wherein the subscription updater is configured to:
simultaneously or successively send, after restarting, subscription update requests to nodes in a PCC node list to subscribe the LSP state report of the PCC node, or
send, after switching from a stateless operation mode to a stateful operation mode, subscription update requests to nodes in the PCC node list to subscribe the LSP state report of the PCC node, or
send, after switching from a stateful operation mode to a stateless operation mode, subscription update requests to the nodes in the PCC node list to unsubscribe the LSP state report of the PCC node.

9. The apparatus according to claim 8, wherein the subscription initializer is further configured to: transmit an indication information for setting an initial subscription state of the LSP state report of the PCC node as a subscription state in a message of session initialization with each PCC node after restarting and when the stateful PCE is in a stateful operation mode.

10. The apparatus according to claim 8, wherein the subscription initializer is further configured to: send an Open message during session initialization with the PCC node, and transmit a flag bit, for indicating to set an initial subscription state of the LSP state report of all LSPs on the PCC node, in a stateful PCE capability TLV of the Open message.

11. The apparatus according to claim 8, wherein the initial subscription state of the LSP state report of the PCC node comprises: a subscription state or an unsubscription state.

12. The method according to claim 2, wherein setting and notifying the initial subscription state of the LSP state report of the PCC node during session initialization with the PCC node comprises:
sending an Open message during session initialization with the PCC node, and transmitting a flag bit, for indicating to set an initial subscription state of the LSP state report of all LSPs on the PCC node, in a stateful PCE capability type length value, TLV, of the Open message.

13. The method according to claim 2, wherein sending the subscription update request to the PCC node to subscribe or unsubscribe the LSP state report of the PCC node comprises:
sending a PCUpt message to the PCC node, and transmitting a flag bit, for indicating to subscribe or unsubscribe the LSP state report of any LSP on the PCC node, in a stateful PCE request parameters, SRP, object of the PCUpt message.

14. The method according to claim 2, wherein the initial subscription state of the LSP state report of the PCC node comprises: a subscription state or an unsubscription state.

* * * * *

UNITED STATES PATENT AND TRADEMARK OFFICE
CERTIFICATE OF CORRECTION

PATENT NO. : 10,680,972 B2
APPLICATION NO. : 15/565508
DATED : June 9, 2020
INVENTOR(S) : Gang Lu Page 1 of 1

It is certified that error appears in the above-identified patent and that said Letters Patent is hereby corrected as shown below:

On Page 2, Column 2, Item (56), Line 4, under Other Publications, delete "ieff" and insert --ietf--.

On Page 2, Column 2, Item (56), Line 5, under Other Publications, delete "stataeful" and insert --stateful--.

In Column 5, Line 61, delete "on" and insert --one--.

In Column 8, Line 41, delete "subscription to" and insert --subscription--.

In Column 12, Line 23, Claim 1, delete "request" and insert --requests--.

In Column 12, Line 24, Claim 1, delete "to a" and insert --to--.

In Column 12, Line 41, Claim 3, delete "FCC" and insert --PCC--.

In Column 12, Line 66, Claim 5, delete "receeiving" and insert --receiving--.

In Column 13, Line 6, Claim 5, delete "lit" and insert --list--.

In Column 13, Line 33, Claim 8, delete "apparatus;" and insert --apparatus--.

Signed and Sealed this
Eighth Day of December, 2020

Andrei Iancu
*Director of the United States Patent and Trademark Office*